(No Model.)   5 Sheets—Sheet 2.

J. U. MACKENZIE.
ELECTRICAL VISUAL INDICATOR.

No. 273,563.   Patented Mar. 6, 1883.

Attest:
W. W. Seely
E. C. Rowland

Inventor:
James U. Mackenzie,
By Rich'd N. Dyer,
Atty.

(No Model.) 5 Sheets—Sheet 3.
J. U. MACKENZIE.
ELECTRICAL VISUAL INDICATOR.

No. 273,563. Patented Mar. 6, 1883.

Attest:
H. W. Seely
E. C. Rowland

Inventor:
James U. Mackenzie
By Rich'd N. Dyer,
Att'y.

(No Model.)
5 Sheets—Sheet 4.
J. U. MACKENZIE.
ELECTRICAL VISUAL INDICATOR.
No. 273,563. Patented Mar. 6, 1883.
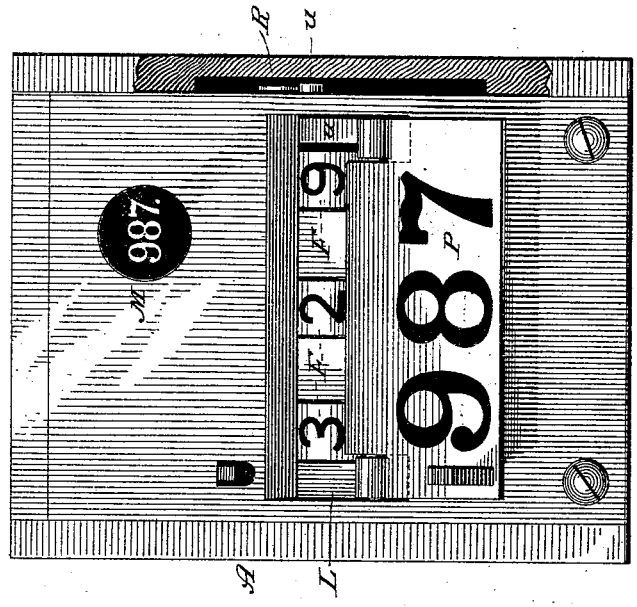
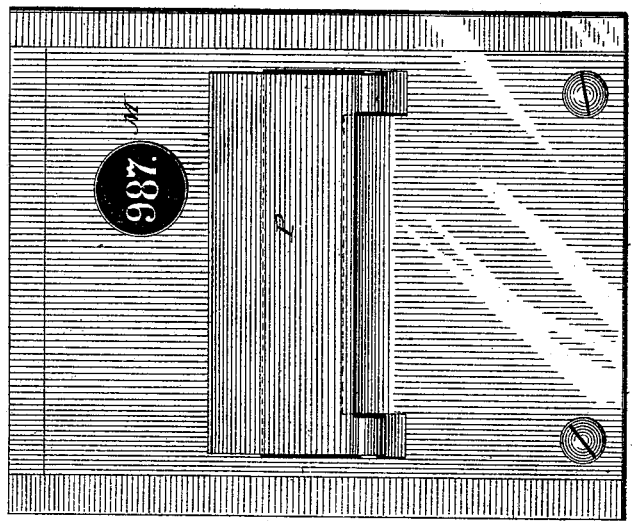

(No Model.) J. U. MACKENZIE. 5 Sheets—Sheet 5.
ELECTRICAL VISUAL INDICATOR.
No. 273,563. Patented Mar. 6, 1883.
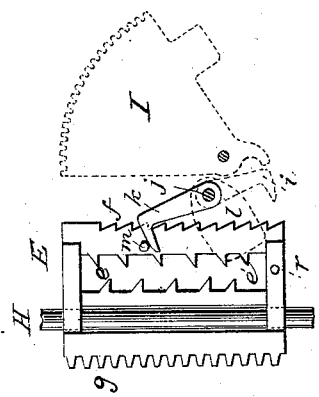
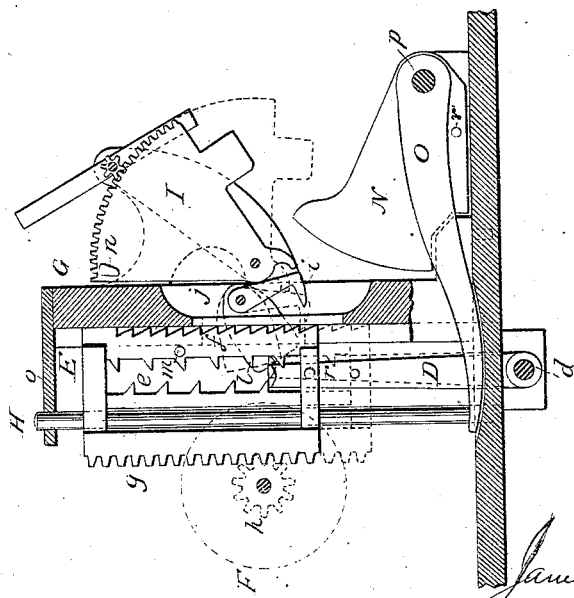

UNITED STATES PATENT OFFICE.

JAMES U. MACKENZIE, OF NEW YORK, N. Y.

ELECTRICAL VISUAL INDICATOR.

SPECIFICATION forming part of Letters Patent No. 273,563, dated March 6, 1883.

Application filed August 12, 1882. (No model.)

*To all whom it may concern:*

Be it known that I, JAMES U. MACKENZIE, of New York city, in the county and State of New York, have invented a certain new and useful Improvement in Electrical Visual Indicators, of which the following is a specification.

The object of the present invention is to produce an electrical visual indicator capable of use for all the purposes to which such an instrument may be applied, which will be exceedingly cheap, simple, and compact in construction, absolutely reliable in operation, and possessing such durability that it will not readily get out of order in any of its parts, and which, further, by reason of its cheapness, compactness, and reliability, will be adapted for many uses to which the visual indicators heretofore produced could not be applied, such as for indicators for telephone-exchanges, district-telegraph service, hotels, or for other similar uses.

A further object of the invention is to produce an electrical indicator of this character, more especially designed for uses of the nature before specifically set forth, which will be capable of being substituted for the ordinary electrical annunciator-drop, and will not only indicate the person who calls, as does the ordinary annunciator-drop, but will also show who or what is wanted, thus resulting in a great saving of time and increasing largely the convenience and efficiency of the service, whatever it may be, as well as economizing by permitting a reduction of the staff of attendants.

The features of invention are particularly hereinafter set forth, and are pointed out by the claims.

Figure 1:
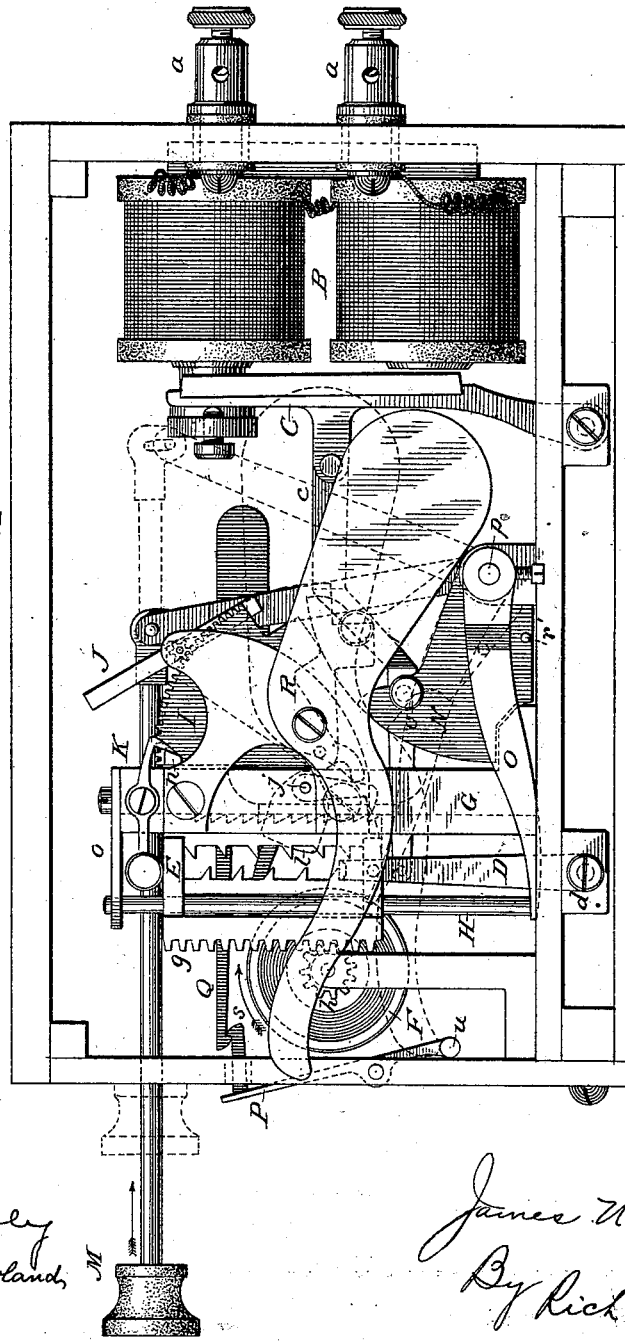
Figure 2:
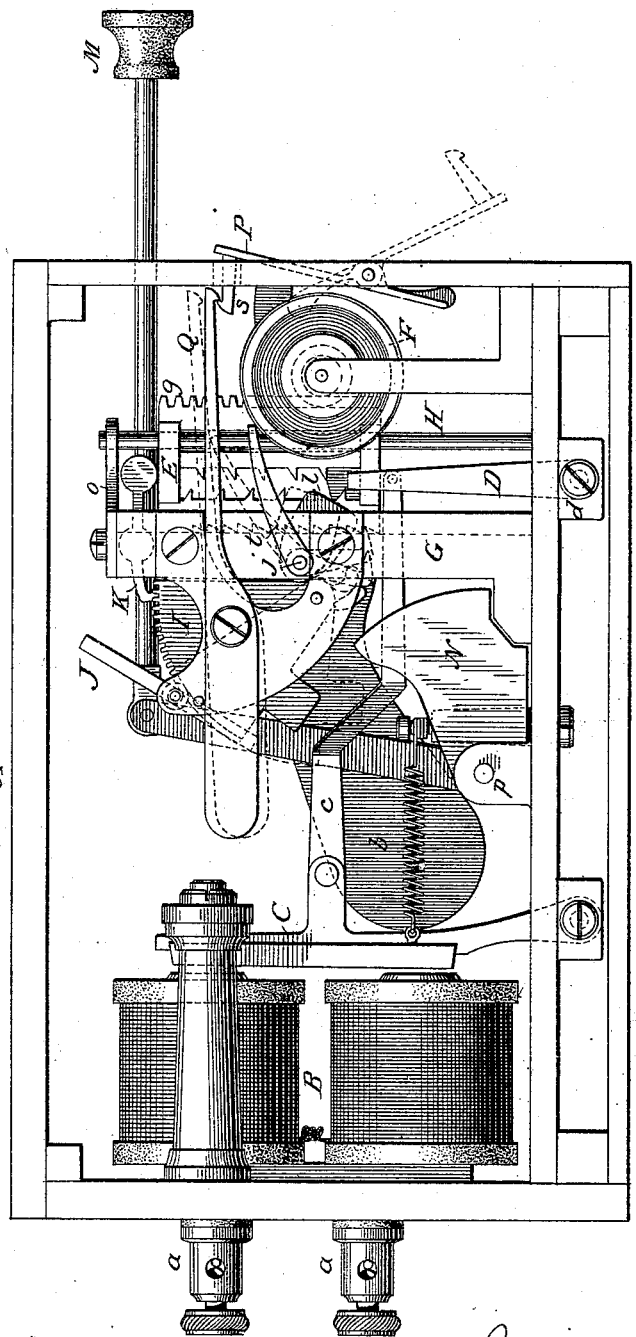
Figure 3:
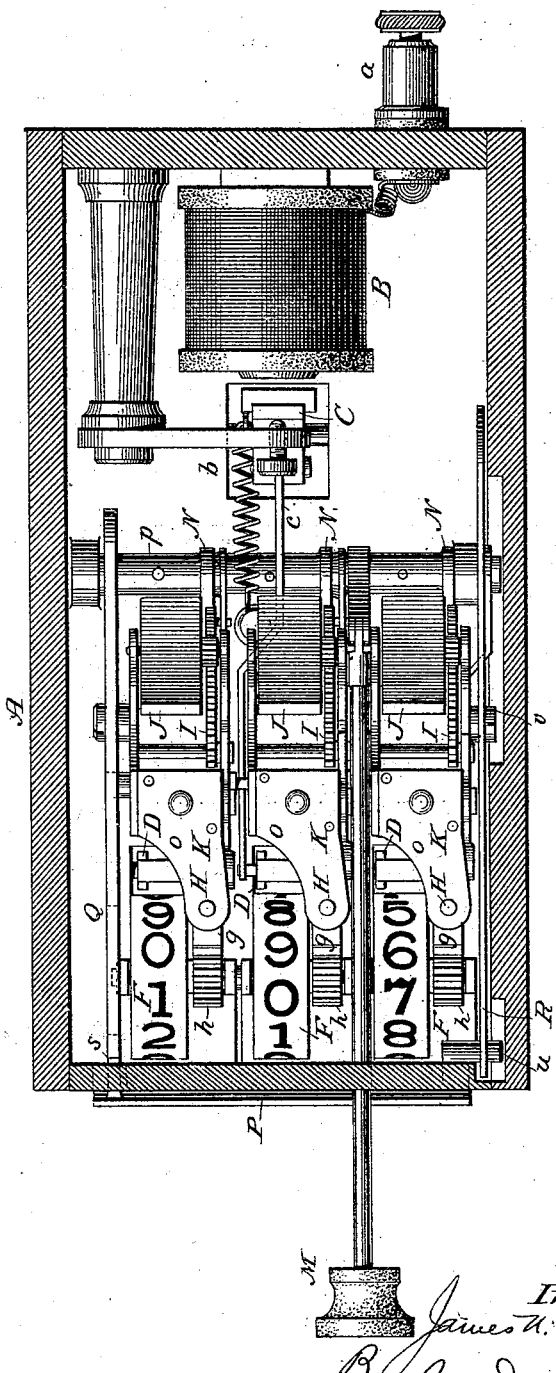

In the accompanying drawings, forming a part hereof, Figure 1 is an elevation from one side of the mechanism of the improved electrical visual indicator and annunciator-drop, the side of the inclosing-case being removed to expose the parts, the position of the restoring devices when moved to reset the parts being shown in dotted lines; Fig. 2, an elevation of the mechanism from the other side, the annunciator-drop being shown as released in dotted lines; Fig. 3, a top view of the mechanism, the inclosing-case being in horizontal section; Fig. 4, a front view of the case of the indicator, the annunciator-drop being raised and locked; Fig. 5, a front view of such case with the annunciator-drop released, such case being broken away at one side to show the annunciator-drop-restoring arm; Fig. 6, a side elevation and partial vertical section of one section of the indicator, the locking-hook being shown as engaging the escapement-rack in dotted lines; Fig. 7, a separate elevation of one of the escapement-racks (other than that of the first section) shown as supported previous to being set for action, the locking-hook and retarded actuating-weight of the preceding section being shown in dotted lines.

The drawings illustrate the mechanism upon an enlarged scale, the size of the parts being considerably reduced in practice; but the instrument may be of the same size or even larger than shown in the drawings.

A is a suitable case, inclosing and protecting the parts. This case supports the binding-posts $a\ a$, to which the line-wires are attached.

B is the operating electro-magnet inclosed within the case. Only one magnet is used to operate the mechanism. It acts upon an armature carried by a lever, C, which is retracted by an adjustable spring, $b$. To the armature-lever C is pivoted a link, $c$, which is connected with an arm projecting from a rock-shaft, $d$. This arm is preferably one of the pallet-arms D, carried by such rock-shaft, of which there is one for each section of the indicator. The arms D project upwardly from the rock-shaft $d$, and carry pallets, as shown, in their upper ends, which pallets engage with the teeth of vertically-sliding escapement-racks E, one of such escapement-racks being provided for each section of the indicator. Each of these racks E is slotted vertically and provided on the edges of its slot with teeth $e$, the teeth on one side of the slot alternating with those on the other side, as will be well understood. The lowermost tooth, $e'$, of each rack is what I term a "safety-tooth," which prevents the release of the locking device of the escapement-rack should the rack of the preceding section be locked when the circuit is in other than its normal condition. This safety-tooth has no function on the first section, since there is no preceding section. Each escapement-rack is provided on its rear edge with locking ratchet-teeth $f$, raking downwardly, such teeth being (at least) equal in number to all the escapement-teeth $e$ of the rack. To the front of each escapement-rack is attached, so as to work therewith, a cog-rack, g, which preferably has sufficient weight to carry the rack downwardly with rapidity and operate the character-wheels F. These character-wheels are mounted upon short shafts, which carry pinions h, engaging with the cog-racks g. The escapement-racks are guided in their vertical movement by grooved posts G and vertical rods H, the rear of each rack sliding in a groove in the face of a post, G, while the arms that support the cog-rack from each escapement-rack have holes through which the rod H passes. In a slot in each post G is pivoted a locking and lifting hook, i, which is secured to a rock-shaft, j, extending to the next succeeding section, if there is one, and there carrying a supporting-hook, k. Each shaft j has a weight, l, secured eccentrically thereto, which throws the hook i normally out of engagement with the teeth f of the escapement-rack with which it operates, and the hook k normally under a pin, m, on the side of the succeeding escapement-rack. All the escapement-racks except that of the first section are provided with a pin, m, engaging a hook, k, while the shaft j, which carries the locking and lifting hook i of the last section, has no supporting-hook k, since there is no succeeding escapement-rack to be held out of action while this last section is operating. Each shaft j is turned against the counteracting force of its weight l by a weight, which is released when the escapement-rack begins to drop, but whose movement is retarded, so that the escapement-rack can reach the limit of its movement and come to a state of rest on the pallet before it will be locked and raised from said pallet.

The weight in this mechanism is furnished by pivoted segments I, which have fingers engaging with the backs of the hooks i and forcing them in succession into the teeth f, locking and raising the escapement-racks and releasing the succeeding ones. Each segment I has cog-teeth engaging with a pinion on the shaft of a fan, J, which retards the movement of the segment. Each fan is somewhat heavier on one side than on the other, which heavier side is brought uppermost when the parts are set for action, so that when the segment is released the overbalanced fan will instantly start the movement. Each segment has a pin, n, which engages with a hooked lever, K, pivoted to the post G, and overweighted at the end opposite the hook, so as to disengage the hook from the pin n. The weighted end of the hooked lever is raised by the escapement-rack; but the dropping of the rack allows the weight of the hooked lever to disengage the weighted segment. The hooked lever has, however, sufficient play to allow the escapement-rack to drop from its safety-tooth e' to its lowermost tooth, e, without releasing the segment. Each lever K is limited in its movement by a plate, o, in order to prevent its displacement should the box containing the mechanism be turned upside down in handling.

The joint operation of the parts thus far described is as follows, it being understood that the character-wheels F are provided with numbers, words, or characters, which are exhibited at an opening or openings, L, in the front of the box, and it being further understood that the instrument is in electrical connection with a suitable transmitter adapted to act with it: Normally the escapement-rack of the first section has its lowermost tooth, e, resting on its pallet, while the escapement-racks of the other sections are raised off of their pallets, being supported by the hooks k. The armature-lever is moved by the action of the magnet and retracting-spring, and the vibrating pallet allows the escapement-rack to fall a definite number of teeth, depending upon the number of times the circuit is closed and opened, when it will come to rest on the pallet. This movement will turn the character-wheel, which has an intermittent movement similar to that of the rack, since it is moved directly thereby, as well as being controlled in its movement by the rack. The drop of the escapement-rack allows the weighted end of the hooked lever K to drop, and the weighted segment is released, it being started by it own weight and that of the over-weighted fan J, and the movement being retarded by the fan. The finger of the segment strikes the hook i and forces it into the teeth f, raising the escapement-rack slightly, so that it will clear the pallet and allow it f ee movement. The turning of the rock-shaft j against weight l withdraws the supporting-hook k from beneath the pin m of the next succeeding escapement-rack and allows the second rack to drop upon the pallet. It will be understood that the second rack is supported off of the pallet, while the first rack is falling, by its supporting-hook k, which is withdrawn only when the first rack is locked and raised off of the pallet by the pivoted hook i. The weight of the segment I of the first section keeps the hook i forced into the teeth f of the first rack during the operation of all the other sections of the box, the position of the first rack not being affected by the operation of succeeding racks. If the first escapement-rack is locked with the circuit normal, (either opened or closed, according to the arrangement,) the second rack will drop until its lowermost tooth, e, rests on the pallet; otherwise the safety-tooth e' will be caught by the pallet, which will be supported until the normal condition of the circuit is restored, when the pallet will go over to the lowermost tooth, e, and the section will be ready to act. This operation continues through as many sections as are used, (one or more,) the only difference being that the last section is simply locked without releasing any other section. When the action has ceased the complete signal will appear at the opening or openings of the box.

To restore the parts to their normal position the following devices are used: A push-button, M, is connected by a rod and arm with a rock-shaft, p, which is provided with a number of weighted wings, N—one for each segment. These wings engage with projection q on the segments I, and when the button M is pushed inwardly are raised and restore the segments to an elevated position. The rock-shaft p also has loose arms O, which engage with pins r on the escapement-racks and raise such racks, the loose arms being lifted by pins r' on the wings N. The arms O do not commence to raise the racks until after the wings N have started the segments, so that the segments will reach their position before the racks raise the hooked levers K to lock such segments. At the same time that the segments are raised the shafts j are released, and their weights l withdraw the hooks i from the teeth f and move the hooks k under the pins m. The weight of the wings N and arms O returns the restoring devices to their normal position, leaving the parts ready for action.

The instrument hereinbefore described is a complete indicator, adapted for all uses to which such instruments may be applied.

For some purposes the opening (or openings) L in the front of the box is closed by a pivoted or sliding shutter or drop, P, which is arranged to disclose the opening and to itself display a number, word, or character when dropped down. The drop has a hook, s, at its upper edge, projecting through an opening in the box when the drop is raised, and engaging a pivoted locking-arm, Q, within the case. This arm Q drops by its own weight into engagement with the hook s, locking the drop. It is raised to release the drop by an arm, t, on the shaft j of the last section. The arm t strikes the arm Q at the same time that the escapement-rack of the last section is locked, and the drop is thus allowed to fall only at the completion of the operation of the instrument. To restore the drop, it is provided with an arm, u, projecting into the case from its lower edge. A pivoted arm, R, within the case rests normally out of contact with the arm u. Arm R is forced down upon arm u, raising the drop, by a projecting head, v, on one of the wings N, which strikes the arm R when the wings are raised to restore the segments. The head v is preferably the eccentric head of a screw, so that by turning it an adjustment can be made to bring the parts into the desired relative relation.

Instead of one drop for the entire box, there may be a drop for each section, which would be released upon the completion of the operation of the particular section. A multiplication of the parts before described would simply be necessary.

It will be noticed that one of the features of the visual indicator heretofore described is the use of gravity throughout in the place of spiral or other springs, the action of weights being much more reliable and uniform than that of springs, and the weights have the advantage of permanency, while springs ultimately give out. The construction and arrangement of parts, it will also be seen, are simple and efficient, there being no fine adjustments or knife-edge stops, and, in addition, there is no strain caused by giving the character-wheels a continuous non-intermittent movement and allowing them at times to gain considerable momentum before being stopped.

The indicator forms an instrument that can be employed upon any line to receive signals, and may be put to all the uses that visual indicators are adapted for—such as burglar-alarms, police and fire alarms, district-telegraphs, &c.—or for private lines, where codes of signals would be used to take the place of telephones, dial or printing telegraphs. The drop used in connection with the box makes the indicator especially convenient and efficient for telephone-exchange drops, hotel-annunciators, and for similar purposes, where it is desirable to show not only the person who is calling, but the person or service wanted. For telephone-exchanges there would preferably be one of the indicators provided for each subscriber, instead of the annunciator-drop now universally used. The subscriber would be provided with a suitable signal-transmitter, arranged for any number within the limits of the system. The subscriber can readily adjust his transmitter and send the signal, and need not have to communicate his wants to the central station over the telephone-line. By having an indicator in addition to his telephone, a subscriber, when called up, may be informed of the number of the person who wants him. For hotel-annunciators a number of room-transmitters are preferably connected with each indicator, either in multiple arc or series. The drop would indicate the section or floor of the house and the wheels would show the room and the service. The transmitter at each room would be arranged to always send a fixed signal (the number of the room,) while it would be adjustable for the different services, any reasonable number of which could be secured.

What I claim is—

1. In an electrical visual indicator, the combination, with two or more escapement-racks worked by pallets vibrated by one electro-magnet, of character-wheels operated and controlled directly by such escapement-racks, substantially as set forth.

2. In an electrical visual indicator, the combination, with two or more vertically-sliding escapement-racks controlled by pallets vibrated by one electro-magnet, of a cog-rack carried by each escapement-rack, a character-wheel, and a pinion engaging the cog-rack and turning the character-wheel, substantially as set forth.

3. In an electrical visual indicator, the combination, with two or more escapement-racks controlled by a pallet vibrated by one electro-magnet, of a character-wheel for each escapement-rack, and means, independent of the character-wheel, for locking each escapement-rack directly at any point of its movement, substantially as set forth.

4. In an electrical visual indicator, the combination, with an escapement controlled by an electro-magnet, of a device for locking such escapement after it has come to rest, such locking device having a retarded movement, substantially as set forth.

5. In an electrical visual indicator, the combination, with an escapement-rack controlled by a pallet vibrated electro-magnetically, of a locking device engaging such rack directly, and having a retarded movement, substantially as set forth.

6. In an electrical visual indicator, the combination, with an escapement-rack controlled by a pallet vibrated electro-magnetically, and having a set of locking-teeth, of a locking-hook forced into the teeth of the rack by a weight having a retarded movement, and a locking device for the weight, released by the drop of the escapement-rack, substantially as set forth.

7. In an electrical visual indicator, the combination, with an electro-magnetic escapement having locking-teeth, of a locking-hook, a pivoted segment forcing such hook into the teeth of the escapement-rack, and a fan for retarding the movement of the segment, substantially as set forth.

8. In an electrical visual indicator, the combination, with a vertically-sliding escapement-rack controlled by a pallet vibrated electro-magnetically, and having a set of locking-teeth, of a pivoted hook forced into such teeth when the rack has finished its movement, locking such rack, and raising it off of the pallet by a pivotal movement of the hook continued after such hook strikes the locking-teeth, substantially as set forth.

9. In an electrical visual indicator, the combination, with an escapement-rack controlled by a pallet vibrated electro-magnetically, and having a set of locking-teeth, of a pivoted locking-hook, a weight keeping such hook normally out of engagement with the locking-teeth of the rack, and a weight having a retarded movement, such latter weight being released by the movement of the escapement-rack and forcing said locking-hook into the teeth of the rack, substantially as set forth.

10. In an electrical visual indicator, the combination, with an escapement-rack, of a locking-hook withdrawn normally, a weighted segment forcing such hook into action, a fan for retarding the movement of the segment, and a pivoted hooked lever locking the segment, and raised by the rack, the dropping of such rack releasing the lever and unlocking the segment, substantially as set forth.

11. In an electrical visual indicator, the combination, with two or more escapement-racks, of character-wheels operated and controlled directly by such racks, vibrating pallets controlling the racks and operated by one electro-magnet, means for supporting the second and succeeding racks out of operative connection with the pallets, and means for locking each rack directly at the completion of its movement and raising it off of the pallet, and releasing at the same time the next succeeding escapement-rack, substantially as set forth.

12. In an electrical visual indicator, the combination, with two escapement-racks controlled by pallets vibrated electro-magnetically, of a rock-shaft provided with a locking-hook and a supporting-hook, thrown in opposite directions by the movement of the shaft and acting directly upon the racks, the locking-hook being held normally out of action and the supporting-hook normally in action, and a part having a retarded movement for turning such shaft and throwing the locking-hook into action and the supporting-hook out of action, such part being released by the movement of the first of the two escapement-racks, substantially as set forth.

13. In an electrical visual indicator, the combination, with two escapement-racks, each having locking-teeth and one (or each) having a supporting pin or projection, such racks being controlled by pallets vibrated electro-magnetically, of a weighted rock-shaft provided with oppositely-moving locking-hook and supporting-hook, a weighted segment for turning such shaft against its normal tendency, a fan retarding the movement of such segment, and a locking device released by the movement of the first rack for holding such segment, substantially as set forth.

14. In an electrical visual indicator, the combination, with the escapement-racks, vibrating pallets, and locking devices, of the rock-shaft and the arms for raising the racks, substantially as set forth.

15. In an electrical visual indicator, the combination, with the escapement-racks, the vibrating pallets, the weighted segments, and the locking devices, of the rock-shaft having wings and arms for raising such segments and racks in succession, substantially as set forth.

16. The combination, in an electrically-operated visual indicator, of means for indicating any one of a number of visual signals, and a means indicating a fixed visual signal, substantially as set forth.

17. The combination, with an electrically-operated visual indicator indicating any one of a number of visual signals, of a drop or drops indicating a fixed visual signal and released by the action of the indicator mechanism, substantially as set forth.

18. The combination, with an electrical visual indicator, of a drop or drops released by the action of such indicator, and a restoring device connected with and operated by the restoring device of the indicator mechanism, substantially as set forth.

19. In an electrical visual indicator, the combination, with an electro-magnetic escapement or escapements, of a pivoted drop, means for locking said drop in a raised position, and means for releasing the drop operated by the locking device of an escapement, substantially as set forth.

20. In an electrical visual indicator, the combination, with an electro-magnetic escapement or escapements, of a pivoted drop having an arm projecting within the indicator-case, a pivoted lever for moving such arm, and a projection from a moving part of the indicator-restoring device for operating such pivoted lever, substantially as set forth.

21. In an electrical visual indicator, the combination, with an electro-magnetic escapement or escapements, the locking, supporting, and releasing devices and the character-wheels, of a pivoted drop and a restoring device resetting both the indicator mechanism and the drop simultaneously, and an adjustable connection between the drop and the restoring device for giving the parts the desired relation, substantially as set forth.

This specification signed and witnessed this 8th day of August, 1882.

JAMES U. MACKENZIE.

Witnesses:
H. W. SEELY,
EDWARD H. PYATT.